(12) United States Patent
Bishop et al.

(10) Patent No.: US 9,401,313 B2
(45) Date of Patent: Jul. 26, 2016

(54) AUTOMATED OPTICAL INSPECTION OF UNIT SPECIFIC PATTERNING

(71) Applicant: DECA Technologies Inc., Tempe, AZ (US)

(72) Inventors: Craig Bishop, Tucson, AZ (US); Vaibhav Joga Singh Bora, Chandler, AZ (US); Christopher M. Scanlan, Chandler, AZ (US); Timothy L. Olson, Phoenix, AZ (US)

(73) Assignee: DECA Technologies, Inc., Tempe, AZ (US)

( * ) Notice: Subject to any disclaimer, the term of this patent is extended or adjusted under 35 U.S.C. 154(b) by 0 days.

(21) Appl. No.: 14/946,464

(22) Filed: Nov. 19, 2015

(65) Prior Publication Data

US 2016/0141213 A1    May 19, 2016

Related U.S. Application Data

(60) Provisional application No. 62/081,676, filed on Nov. 19, 2014.

(51) Int. Cl.

| | |
|---|---|
| *G06F 17/50* | (2006.01) |
| *H01L 21/66* | (2006.01) |
| *H01L 21/78* | (2006.01) |
| *H01L 23/544* | (2006.01) |
| *H01L 23/00* | (2006.01) |
| *H01L 21/768* | (2006.01) |

(52) U.S. Cl.
CPC ............ *H01L 22/12* (2013.01); *G06F 17/5081* (2013.01); *H01L 21/768* (2013.01); *H01L 21/78* (2013.01); *H01L 23/544* (2013.01); *H01L 24/03* (2013.01); *H01L 24/11* (2013.01); *G06F 2217/12* (2013.01); *H01L 2223/54453* (2013.01); *H01L 2224/0231* (2013.01); *H01L 2224/037* (2013.01); *H01L 2224/117* (2013.01)

(58) Field of Classification Search
None
See application file for complete search history.

(56) References Cited

U.S. PATENT DOCUMENTS

| | | | | |
|---|---|---|---|---|
| 4,799,175 | A * | 1/1989 | Sano ................... | G01R 31/2805 348/126 |
| 7,155,052 | B2 * | 12/2006 | Geshel ................. | G06T 7/0006 348/124 |
| 7,388,978 | B2 * | 6/2008 | Duvdevani ......... | G06K 9/00973 382/141 |
| 7,583,833 | B2 * | 9/2009 | McIntyre ........... | G05B 23/0229 324/537 |
| 8,040,504 | B2 * | 10/2011 | Saito .................... | G01N 21/956 250/310 |
| 8,089,058 | B2 * | 1/2012 | Regensburger .... | G05B 23/0216 250/559.4 |
| 2007/0064998 | A1 * | 3/2007 | Umeda ..................... | G03F 1/84 382/149 |
| 2014/0149811 | A1 * | 5/2014 | Ross ..................... | G01R 31/311 714/724 |

* cited by examiner

*Primary Examiner* — Leigh Garbowski
(74) *Attorney, Agent, or Firm* — Booth Udall Fuller, PLC

(57) ABSTRACT

A method of automated optical inspection (AOI) for a plurality of unique semiconductor packages can comprise providing a plurality of semiconductor die formed as a reconstituted wafer. A plurality of unit specific patterns can be formed by forming a unit specific pattern over each of the plurality of semiconductor die, wherein each of the unit specific patterns is customized to fit its respective semiconductor die. A plurality of images can be acquired by acquiring an image for each of the plurality of unit specific patterns. A plurality of unique reference standards can be created by creating a unique reference standard for each of the plurality of unit specific patterns. Defects can be detected in the plurality of unit specific patterns by comparing one of the plurality of unique reference standards to a corresponding one of the plurality of images for each of the plurality of unit specific patterns.

20 Claims, 15 Drawing Sheets

US 9,401,313 B2

AUTOMATED OPTICAL INSPECTION OF UNIT SPECIFIC PATTERNING

RELATED APPLICATION

This disclosure claims the benefit of U.S. provisional patent application 62/081,676, filed Nov. 19, 2014, the entirety of the disclosure of which is hereby incorporated by reference.

TECHNICAL FIELD

This disclosure relates to semiconductor packages including panelized packaging and wafer-level-chip-scale-packages (WLCSPs) and automated optical or visual inspection of the semiconductor package during manufacturing.

BACKGROUND

Conventional automated optical inspection (AOI), such as for packaging of semiconductor devices that includes fixed or constant features and does not include unit specific features of unit specific, is known in the art, and has been conventionally accomplished by comparing a reference image or "golden image" with an image captured during visual inspection of the conventional semiconductor device. The golden image is constructed by combining multiple images of known good parts. The combination of multiple images effectively provides an average or idealized part or package that averages out defects, aberrations, variations, or "noise" that is present on even acceptable, functional, or good parts.

An image captured by visual inspection is simply a visual or graphical representation, like a photograph, that shows a package or package component as it actually exists or was made, which can differ from its original design or intended structure. After having both a golden image and an actual image captured during visual inspection, the image or images captured of various parts of semiconductor packages are each compared, in turn, against the idealized or standardized golden image. In some instances, the comparison is done by subtraction so that the golden image and the image captured by visual inspection are compared pixel-by-pixel to produce a resulting image that shows or indicates differences between the golden image and the image captured by visual inspection. Results of the comparison can be processed with threshold filters and spatial filters to find defects in the visually inspected product. Defective products can be identified and dealt with accordingly.

SUMMARY

A need exists for AOI of semiconductor devices comprising unit specific pattering. Accordingly, in one aspect, a method of AOI for a plurality of unique semiconductor packages can comprise a method of AOI for a plurality of unique semiconductor packages comprising providing a plurality of semiconductor die formed as a reconstituted wafer. A plurality of unit specific patterns can be formed as a unit specific pattern over each of the plurality of semiconductor die, wherein each of the unit specific patterns is customized to fit its respective semiconductor die. A plurality of images can be acquired by acquiring an image for each of the plurality of unit specific patterns. A plurality of unique reference standards can be created by creating a unique reference standard for each of the plurality of unit specific patterns. Defects can be detected in the plurality of unit specific patterns by comparing one of the plurality of unique reference standards to a corresponding one of the plurality of images for each of the plurality of unit specific patterns. The reconstituted wafer can be singulated to form the plurality of unique semiconductor packages.

The method of AOI for a plurality of unique semiconductor packages can further comprise pre-processing the plurality of images for each of the plurality of unit specific patterns by converting the plurality of images into a plurality of binary images, the plurality of binary images indicating conductive paths and non-conductive paths, creating the plurality of unique reference standards as a plurality of net lists of XY coordinates, and comparing one of the plurality of net lists of XY coordinates to the corresponding one of the plurality of binary images for each of the plurality of unit specific patterns by mapping the one of the plurality of net lists of the XY coordinates onto the one of the plurality of binary images for each of the plurality of unit specific patterns. The method can further comprise finding a path between XY coordinates of one of the plurality of net lists within the conductive paths of the binary images using a search algorithm or connectivity algorithm to validate electrical connectivity. The method can further comprise verifying that separate nets of the plurality of net lists are not connected using a pixel expansion algorithm or fill algorithm.

The method can further comprise providing a plurality of computer-aided design (CAD) images comprising a CAD image corresponding to each of the unit specific patterns formed over each of the plurality of semiconductor die, and creating the plurality of unique reference standards by creating a plurality of dynamic reference images by rasterizing or modeling the plurality of CAD images for each of the plurality of unit specific patterns. The method can further comprise rasterizing the plurality of CAD images for each of the plurality of unit specific patterns using a step response to create grayscale images before comparing one of the plurality of dynamic reference images to the corresponding one of the plurality of images for each of the plurality of customized patterns to detect defects in the plurality of unit specific patterns.

The method can further comprise providing a plurality of CAD images comprising a CAD image corresponding to each of the unit specific patterns formed over each of the plurality of semiconductor die, wherein the plurality of unique reference standards comprise geometry extracted from the plurality of CAD images to create extracted CAD geometry in a common space, wherein the plurality of images for each of the plurality of unit specific patterns comprise geometry extracted from the plurality of images to create extracted image geometry in the common space, and wherein detecting defects in the plurality of unit specific patterns comprises detecting defects in the plurality of unit specific patterns by comparing extracted CAD geometry and the extracted image geometry in the common space.

The method can further comprise providing a plurality of computer-aided design (CAD) images comprising a CAD image corresponding to each of the unit specific patterns formed over each of the plurality of semiconductor die, converting the plurality of images of the unit specific patterns from grayscale images to binary images to form a plurality of binary images for the plurality of unit specific patterns, and detecting defects in the plurality of unit specific patterns by comparing binary data from the plurality of CAD images and the plurality of binary images for the plurality of unit specific patterns.

The method can further comprise forming the plurality of unit specific patterns comprising one or more redistribution layers (RDLs), traces, vias, pillars, columns, under bump metallizations (UBMs), or bumps. The method can further comprise determining which of the plurality of unique semiconductor packages are known good units from detecting defects in the plurality of unit specific patterns.

In another aspect, a method of AOI for a plurality of unique semiconductor packages can comprise acquiring a plurality of images by acquiring an image for each of a plurality of unit specific patterns formed on a reconstituted wafer, creating a plurality of unique reference standards by creating a unique reference standard for each of the plurality of unit specific patterns, and detecting defects in the plurality of unit specific patterns by comparing one of the plurality of unique reference standards to a corresponding one of the plurality of images for each of the plurality of unit specific patterns.

The method of AOI for a plurality of unique semiconductor packages can further comprise pre-processing the plurality of images for each of the plurality of unit specific patterns by converting the plurality of images into a plurality of binary images, the plurality of binary images indicating conductive paths and non-conductive paths, creating the plurality of unique reference standards as a plurality of net lists of XY coordinates, and comparing one of the plurality of net lists of XY coordinates to the corresponding one of the plurality of binary images for each of the plurality of unit specific patterns by mapping the one of the plurality of net lists of the XY coordinates onto the one of the plurality of binary images for each of the plurality of unit specific patterns. The method can further comprise finding a path between XY coordinates of one of the plurality of net lists within the conductive paths of the binary images using a search algorithm or connectivity algorithm to validate electrical connectivity. The method can further comprise verifying that separate nets of the plurality of net lists are not connected using a pixel expansion algorithm or fill algorithm.

The method of AOI for a plurality of unique semiconductor packages can further comprise providing a plurality of computer-aided design (CAD) images comprising a CAD image corresponding to each of the unit specific patterns formed over each of the plurality of semiconductor die, and creating the plurality of unique reference standards by creating a plurality of dynamic reference images by rasterizing or modeling the plurality of CAD images for each of the plurality of unit specific patterns. The method can further comprise rasterizing the plurality of CAD images for each of the plurality of unit specific patterns using a step response to create grayscale images before comparing one of the plurality of dynamic reference images to the corresponding one of the plurality of images for each of the plurality of customized patterns to detect defects in the plurality of unit specific patterns.

The method can further comprise providing a plurality of CAD images comprising a CAD image corresponding to each of the unit specific patterns formed over each of the plurality of semiconductor die, wherein the plurality of unique reference standards comprise geometry extracted from the plurality of CAD images to create extracted CAD geometry in a common space, wherein the plurality of images for each of the plurality of unit specific patterns comprise geometry extracted from the plurality of images to create extracted image geometry in the common space, and wherein detecting defects in the plurality of unit specific patterns comprises detecting defects in the plurality of unit specific patterns by comparing extracted CAD geometry and the extracted image geometry in the common space.

The method of AOI for a plurality of unique semiconductor packages can further comprise providing a plurality of CAD images comprising a CAD image corresponding to each of the unit specific patterns formed over each of the plurality of semiconductor die, converting the plurality of images of the unit specific patterns from grayscale images to binary images to form a plurality of binary images for the plurality of unit specific patterns, and detecting defects in the plurality of unit specific patterns by comparing binary data from the plurality of CAD images and the plurality of binary images for the plurality of unit specific patterns.

The method of AOI for a plurality of unique semiconductor packages can further comprise forming the plurality of unit specific patterns comprising one or more RDLs, traces, vias, pillars, columns, UBMs, or bumps. The method can further comprise determining which of the plurality of unique semiconductor packages are known good units from detecting defects in the plurality of unit specific patterns.

The foregoing and other aspects, features, and advantages will be apparent to those artisans of ordinary skill in the art from the DESCRIPTION and DRAWINGS, and from the CLAIMS.

DETAILED DESCRIPTION

Figure 1A:
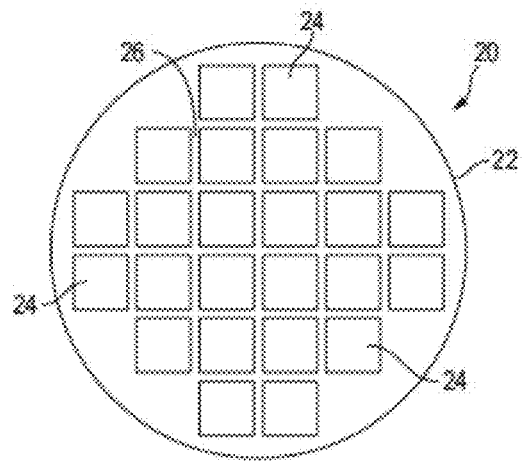
FIGS. 1A-1C illustrate a plurality of semiconductor die for use in a semiconductor package or embedded die package in accordance with an embodiment of the disclosure.

The present disclosure includes one or more embodiments in the following description with reference to the figures, in which like numerals represent the same or similar elements. It will be appreciated by those skilled in the art that the description is intended to cover alternatives, modifications, and equivalents as may be included within the spirit and scope of the disclosure as defined by the appended claims and their equivalents as supported by the following disclosure and drawings.

In the following description, numerous specific details are set forth, such as specific configurations, compositions, and processes, etc., in order to provide a thorough understanding of the disclosure. In other instances, well-known processes and manufacturing techniques have not been described in particular detail in order to not unnecessarily obscure the disclosure. Furthermore, the various embodiments shown in the FIGS. are illustrative representations and are not necessarily drawn to scale.

The word "exemplary," "example" or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

The terms "over," "between," and "on" as used herein refer to a relative position of one layer with respect to other layers. One layer deposited or disposed above or under another layer may be directly in contact with the other layer or may have one or more intervening layers. One layer deposited or disposed between layers may be directly in contact with the layers or may have one or more intervening layers. In contrast, a first layer "on" a second layer is in contact with that second layer.

Semiconductor devices are generally manufactured using two complex manufacturing processes: front-end manufacturing and back-end manufacturing. Front-end manufacturing involves the formation of a plurality of die on the surface of a semiconductor wafer. Each die on the wafer contains active and passive electrical components, which are electrically connected to form functional electrical circuits. Active electrical components, such as transistors and diodes, have the ability to control the flow of electrical current. Passive electrical components, such as capacitors, inductors, resistors, and transformers, create a relationship between voltage and current necessary to perform electrical circuit functions.

Passive and active components are formed over the surface of the semiconductor wafer by a series of process steps including doping, deposition, photolithography, etching, and planarization. Doping introduces impurities into the semiconductor material by techniques such as ion implantation or thermal diffusion. The doping process modifies the electrical conductivity of semiconductor material in active devices, transforming the semiconductor material into an insulator, conductor, or dynamically changing the semiconductor material conductivity in response to an electric field or base current. Transistors contain regions of varying types and degrees of doping arranged as necessary to enable the transistor to promote or restrict the flow of electrical current upon the application of the electric field or base current.

Active and passive components are formed by layers of materials with different electrical properties. The layers can be formed by a variety of deposition techniques determined in part by the type of material being deposited. For example, thin film deposition can involve chemical vapor deposition (CVD), physical vapor deposition (PVD), electrolytic plating, and electroless plating processes. Each layer is generally patterned to form portions of active components, passive components, or electrical connections between components.

The layers can be patterned using photolithography. Patterning is the basic operation by which portions of the top layers on the semiconductor wafer surface are removed. Portions of the semiconductor wafer can be removed using photolithography, photomasking, masking, oxide or metal removal, photography and stenciling, and microlithography. Photolithography includes forming a pattern in reticles or a photomask and transferring the pattern into the layer to be patterned such as surface layers of the semiconductor wafer. Photolithography forms the horizontal dimensions of active and passive components on the surface of the semiconductor wafer in a two-step process. First, the pattern on the reticle or masks is transferred into a layer of photoresist. Photoresist is a light-sensitive material that undergoes changes in structure and properties when exposed to light. The process of changing the structure and properties of the photoresist occurs as either negative-acting photoresist or positive-acting photoresist. Second, the photoresist layer is transferred into the wafer surface. The transfer occurs when etching removes the portion of the top layers of semiconductor wafer not covered by the photoresist. Alternatively, some types of materials are patterned by directly depositing material into the areas or voids formed by the photoresist or by a previous deposition/etch process using techniques such as electroless and electrolytic plating. The chemistry of photoresists is such that the photoresist remains substantially intact and resists removal by chemical etching solutions or plating chemistries while the portion of the top layers of the semiconductor wafer not covered by the photoresist is removed or is added to by plating. The process of forming, exposing, and removing the photoresist, as well as the process of removing a portion of the semiconductor wafer or adding to a portion of the wafer can be modified according to the particular resist used and the desired results.

In negative-acting photoresists, photoresist is exposed to light and is changed from a soluble condition to an insoluble condition in a process known as polymerization. In polymerization, unpolymerized material is exposed to a light or energy source and polymers form a cross-linked material that is etch-resistant. In most negative resists, the polymers are polyisoprenes. Removing the soluble portions (i.e. the portions not exposed to light) with chemical solvents or developers leaves a hole in the resist layer that corresponds to the opaque pattern on the reticle. A mask whose pattern exists in the opaque regions is called a clear-field mask.

In positive-acting photoresists, photoresist is exposed to light and is changed from a relatively nonsoluble condition to a much more soluble condition in a process known as photosolubilization. In photosolubilization, the relatively insoluble resist is exposed to the proper light energy and is converted to a more soluble state. The photosolubilized part of the resist can be removed by a solvent in the development process. The basic positive photoresist polymer is the phenol-formaldehyde polymer, also called the phenol-formaldehyde novolak resin. Removing the soluble portions (i.e. the portions exposed to light) with chemical solvents or developers leaves a hole in the resist layer that corresponds to the transparent pattern on the reticle. A mask whose pattern exists in the transparent regions is called a dark-field mask. After removal of the top portion of the semiconductor wafer not covered by the photoresist, the remainder of the photoresist is removed, leaving behind a patterned layer.

Alternatively, photolithography can be accomplished without the use of a photoresist when the material to be patterned is itself photosensitive. In this case, the photosensitive material is coated on the device surface using spin coating, lamination, or other suitable deposition technique. A pattern is then transferred from a photomask to the photosensitive material using light in an operation typically called exposure. In an embodiment, the portion of the photosensitive material subjected to light is removed, or developed, using a solvent, exposing portions of the underlying layer. Alternatively, in another embodiment, the portion of the photosensitive material not subjected to light is removed, or developed, using a solvent, exposing portions of the underlying layer. The remaining portions of the photosensitive film can become a permanent part of the device structure.

Depositing a thin film of material over an existing pattern can exaggerate the underlying pattern and create a non-uniformly flat surface. A uniformly flat surface is required to produce smaller and more densely packed active and passive components. Planarization can be used to remove material from the surface of the wafer and produce a uniformly flat surface. Planarization involves polishing the surface of the wafer with a polishing pad. An abrasive material and corrosive chemical are added to the surface of the wafer during polishing. Alternatively, mechanical abrasion without the use of corrosive chemicals is used for planarization. In some embodiments, purely mechanical abrasion is achieved by using a belt grinding machine, a standard wafer backgrinder, surface lapping machine, or other similar machine. The combined mechanical action of the abrasive and corrosive action of the chemical removes any irregular topography, resulting in a uniformly flat surface.

Back-end manufacturing refers to cutting or singulating the finished wafer into the individual semiconductor die and then packaging the semiconductor die for structural support and environmental isolation. To singulate the semiconductor die, the wafer can be cut along non-functional regions of the wafer called saw streets or scribes. The wafer is singulated using a laser cutting tool or saw blade. After singulation, the individual semiconductor die are mounted to a package substrate that includes pins or contact pads for interconnection with other system components. Contact pads formed over the semiconductor die are then connected to contact pads within the package. The electrical connections can be made with solder bumps, stud bumps, conductive paste, redistribution layers, or wirebonds. An encapsulant or other molding material is deposited over the package to provide physical support and electrical isolation. The finished package is then inserted into an electrical system and the functionality of the semiconductor device is made available to the other system components.

The electrical system can be a stand-alone system that uses the semiconductor device to perform one or more electrical functions. Alternatively, the electrical system can be a sub-component of a larger system. For example, the electrical system can be part of a cellular phone, personal digital assistant (PDA), digital video camera (DVC), or other electronic communication device. Alternatively, the electrical system can be a graphics card, network interface card, or other signal processing card that can be inserted into a computer. The semiconductor package can include microprocessors, memories, application specific integrated circuits (ASIC), logic circuits, analog circuits, RF circuits, discrete devices, or other semiconductor die or electrical components. Miniaturization and weight reduction are essential for the products to be accepted by the market. The distance between semiconductor devices must be decreased to achieve higher density.

By combining one or more semiconductor packages over a single substrate, manufacturers can incorporate pre-made components into electronic devices and systems. Because the semiconductor packages include sophisticated functionality, electronic devices can be manufactured using less expensive components and a streamlined manufacturing process. The resulting devices are less likely to fail and less expensive to manufacture resulting in a lower cost for consumers.

In the following discussion, certain embodiments are described with regard to the formation of a single die FOWLP, though embodiments of the disclosure are not limited to such. Embodiments of the disclosure may be used in any panelized packaging application including single-die applications, multi-die modules, die embedded in a printed wiring board panel or PCB, some combination of a die(s) and a passive component(s) within a module, or some combination of one or more device unit(s) and another component(s) within a module.

FIG. 1A shows a plan view of a semiconductor wafer 20 with a base substrate material 22, such as, without limitation, silicon, germanium, gallium arsenide, indium phosphide, or silicon carbide, for structural support. A plurality of semiconductor die or components 24 is formed on wafer 20 separated by a non-active, inter-die wafer area or saw street 26 as described above. Saw street 26 provides cutting areas to singulate semiconductor wafer 20 into individual semiconductor die 24.

Figure 1B:
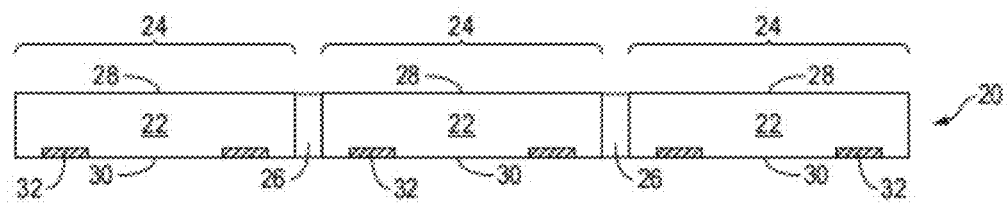

FIG. 1B shows a cross-sectional view of a portion of semiconductor wafer 20 shown previously in the plan view of FIG. 1A. Each semiconductor die 24 has a backside or back surface 28 and active surface 30 opposite the backside. Active surface 30 contains analog or digital circuits implemented as active devices, passive devices, conductive layers, and dielectric layers formed within the die and electrically interconnected according to the electrical design and function of the semiconductor die. For example, the circuit may include one or more transistors, diodes, and other circuit elements formed within active surface 30 to implement analog circuits or digital circuits, such as DSP, ASIC, memory, or other signal processing circuit. Semiconductor die 24 may also contain integrated passive devices (IPDs), such as inductors, capacitors, and resistors, for RF signal processing.

An electrically conductive layer 32 is formed over active surface 30 using PVD, CVD, electrolytic plating, electroless plating process, or other suitable metal deposition process. Conductive layer 32 can be one or more layers of aluminum (Al), copper (Cu), tin (Sn), nickel (Ni), gold (Au), silver (Ag), or other suitable electrically conductive material. Conductive layer 32 operates as contact pads or bond pads electrically connected to the circuits on active surface 30. Conductive layer 32 can be formed as contact pads disposed side-by-side a first distance from the edge of semiconductor die 24, as shown in FIG. 1B. Alternatively, conductive layer 32 can be formed as contact pads that are offset in multiple rows such that a first row of contact pads is disposed a first distance from the edge of the die, and a second row of contact pads alternating with the first row is disposed a second distance from the edge of the die. In another embodiment, conductive layer 32 can be formed as contact pads disposed in an array across an entire surface area of semiconductor die 24. The full array of contact pads can be formed in a regular or irregular pattern across the entire surface of semiconductor die 24 according to the configuration and design of the semiconductor die. Similarly, a size, shape, or orientation of the contact pads can also be irregular with respect to each other and can include a length of conductive material that routes signals laterally across active surface 30 of semiconductor die 24.

Figure 1C:
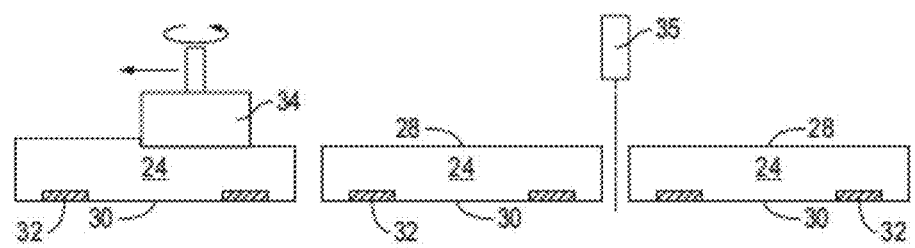

In FIG. 1C, semiconductor wafer 20 undergoes an optional grinding operation with grinder 34 to planarize the surface and reduce thickness of the semiconductor wafer. A chemical etch can also be used to remove and planarize semiconductor wafer 20. Semiconductor wafer 20 is singulated through saw street 26 using a saw blade or laser cutting tool 35 into individual semiconductor die 24.

Figure 2A:
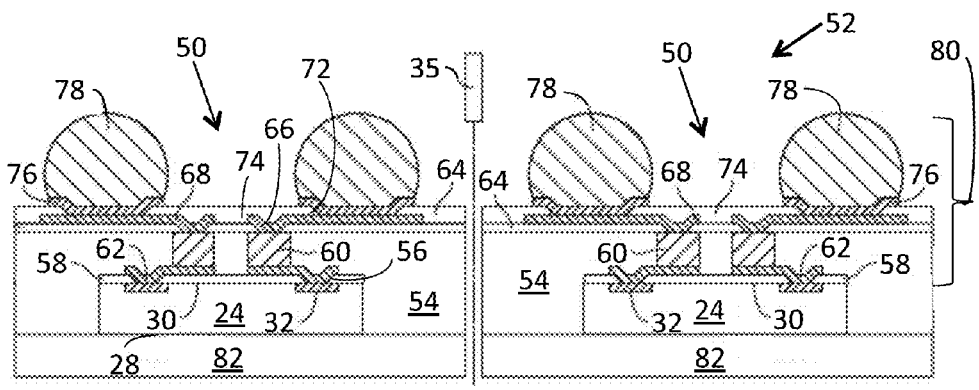
FIGS. 2A and 2B illustrate various views of a semiconductor package.
Figure 2B:
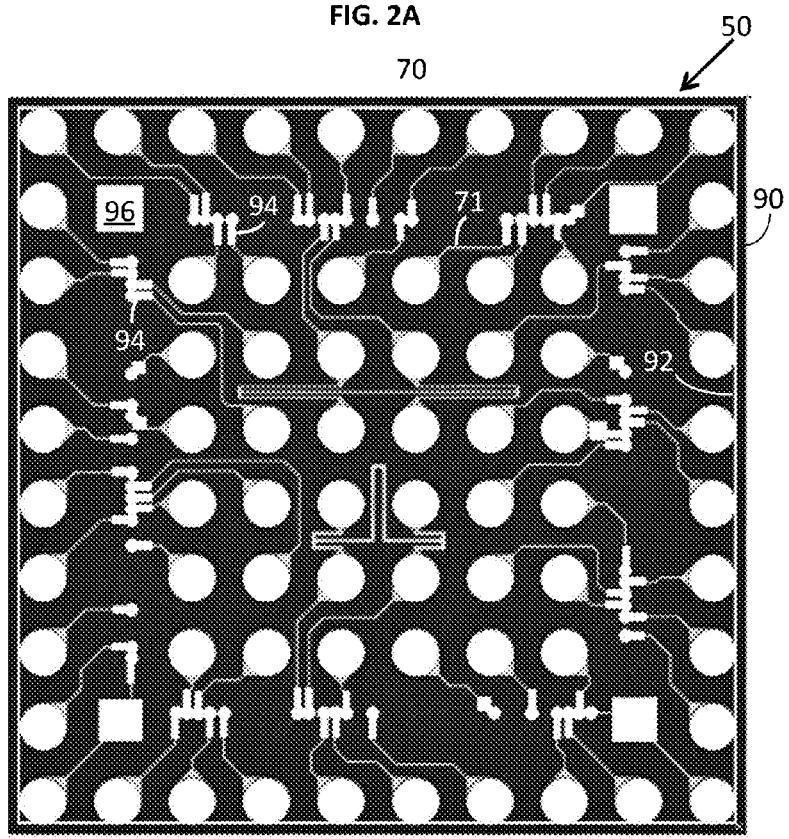

FIGS. 2A and 2B show a plurality of semiconductor packages or semiconductor devices 50 formed and inspected using a method of AOI for features formed with unit specific patterning, package specific patterning, customized patterning, or unique patterning, which is also known under the trademark Adaptive Patterning™. Unit specific patterning refers to a design method that adapts circuitry, portions of a build-up structure, such as interconnect structures, build-up interconnect structures, one or more RDLs, traces, patterned conductive layers, routing, vias, pillars, columns, and UBMs, (referred to collectively as "circuitry") to align with the die placement misalignment or other misalignment in the X, Y, and Theta directions. The unit specific pattering can comprise one or more patterning techniques to control for placement misalignment in the X, Y, and Theta directions, including: (i) unit specific routing, which is also known under the trademark Adaptive Routing™, and (ii) unit specific patterning, which is also known under the trademark Adaptive Patterning™.

Unit specific patterning refers to a design method that adapts circuitry to align with the die placement misalignment or other misalignment in the X, Y, and Theta directions by utilizing an auto-routing algorithm to complete the circuitry of the semiconductor package in which the circuitry is being formed. In some instances, the unit specific patterning can be formed or patterned together with a pre-stratum unit design. The prestratum a unit design can comprise fixed circuitry or routing that can be partially routed from the ball grid array (BGA) pads towards contact pads 32 or copper (Cu) pillar pads over the semiconductor die 24 for a semiconductor package, such as a fully-molded semiconductor package. The remaining portion of the package circuitry or routing that is not fixed, which can include about 5-10% of the routing, can be customized or dynamic, and can be completed by an autorouter that creates routing or other structure adapted to the die orientation misalignment in X, Y, and Theta.

Unit specific alignment refers to a design method that adapts circuitry or portions of a build-up structure to align with the die placement misalignment or other misalignment in the X, Y, and Theta directions by rotating, translating in XY directions, or both, features of a pre-defined unit.

FIG. 2A shows a plurality of unique semiconductor packages or semiconductor device 50 being singulated by using the saw blade or laser cutting tool 35 from a reconstituted wafer or molded panel 52. The semiconductor packages 50 can comprise fan-in or fan-out WLCSPs that can be fully molded or encapsulated within encapsulant or mold compound 54 in either a die up or die down position. As used herein, die up refers to a semiconductor die comprising an active surface and a back surface opposite the active surface that is positioned such that the back surface is coupled to, and oriented towards, a carrier or substrate (hereinafter carrier) and the active surface of the semiconductor die is oriented away from the carrier when the semiconductor die is mounted to the carrier. As used herein, die down refers to a semiconductor die comprising an active surface and a back surface opposite the active surface that is positioned such that the active surface is coupled to, and oriented towards, the carrier and the back surface of the semiconductor die is oriented away from the carrier when the semiconductor die is mounted to the carrier.

Semiconductor packages 50 can comprise a first via or opening 56 that can be formed in a first layer, such as a polymer layer, insulating layer, or first polymer layer 58 deposited on a native semiconductor wafer 20 comprising semiconductor die 24. Vias 56 can be opened directly on the die pads 32 and saw street removal regions 26 can be defined for the fab saw street region(s).

A pillar, copper pillar, post, or conductive interconnect 60 can be made of any suitable metal or conductive material and formed after the formation of via 56, after formation of a RDL 62 on the native wafer 20, or both. RDL, routing, or interconnect 62 can be formed as a fan-in or a fan-out RDL. The pillars 60 can be formed by plating or other suitable process to a defined thickness, such as about 5-50 or 5-30 micrometers (μm) before singulation of the native wafer 20. After formation of the copper pillars 60, the semiconductor die 24 can be embedded or molded within encapsulant 54 to form the reconstituted wafer or molded panel 52. The reconstituted wafer or molded panel 52 can be of any size of shape, and can include a wafer, fan-out wafer or panel, embedded die panel, substrate or derivatives thereof. Additionally, the reconstituted wafer 52 may be formed using a PCB process wherein the semiconductor die 24 is embedded within a multi-layer PCB substrate or board. RDL 62 can be a conductive layer that is deposited on the native wafer 20, in the via 56, and on polymer layer 58 to connect the die pad 32 to the pillars 60 at locations within a footprint of semiconductor die 24. The routing 62 can be created by a combination of metal deposition, photo, and etch processes.

A second via, panel via, or opening 66 can be formed in a polymer layer, insulating layer, or second polymer layer 64 deposited over the reconstituted wafer 52, the semiconductor die 24, and on encapsulant 54 and on an exposed end of pillar 60. Vias 66 can be opened directly on the pillars 60 and extend completely through the polymer layer 64. In some instances the vias 66 can also extend through some of encapsulant 54 before arriving at the pillars 60 so that a layer of encapsulant 54 can be present between some but not all of the end of pillar 60 and the polymer layer 64 in which the vias 66 are formed. The vias 66 can be formed using a unit-specific process or by unit specific patterning to account for die shift or shifting of semiconductor die 24 when the reconstituted wafer 52 is formed by disposing the encapsulant 54 around the semiconductor die 24.

One or more RDL, panel RDL, routing, or interconnect layers 68 can be formed as a fan-in or a fan-out RDL. RDL 68 can be a conductive layer that is deposited over the reconstituted wafer 52, in the via 66, and on polymer layer 64 to connect or contact the pillars 60 at locations both within and without a footprint of semiconductor die 24. The RDL 68 can be created by a combination of metal deposition, photo, and etch processes using a unit-specific process or by unit specific patterning to account for die shift or shifting of semiconductor die 24 and a position of vias 66. In some instances the vias 66 can be filled with a conductive interconnect, pillar, post, or conductive via that is separate from the RDL 68 so that the RDL does not extend down into the via 66. The vias 66, including a position or location of the vias 66 can be defined to allow for connectivity from locations of the pillars the RDL 68. Saw street removal regions for the reconstituted panel 52 can be defined for the semiconductor package 50 saw street regions by or near the locations of the RDLs 68. As such, the RDL 68 can comprise pads or ball grid array (BGA) pads 70 that form part of a connection between the pillars 60 and the BGA pads 70.

A third via, under bump via, or opening 72 can be formed in a polymer layer, insulating layer, or third polymer layer 74 deposited over the polymer layer 64, RDL 68, and BGA pads 70. Polymer layer 74 can be the second polymer layer formed on the reconstituted wafer 52 when just one RDL 68 is present. Alternatively, when additional layers of routing are desirable, then additional polymer or insulating layers can also be present. In any case, the vias 72 can be defined in such a way so as to provide or allow for connectivity between the RDL 68 and the subsequently formed under bump metallization/metallurgy (UBM) layer or under bump via (UBV) 76. The UBM can be a multiple metal stack with one or more of an adhesion layer, barrier layer, seed or wetting layer. The positions or locations of the UBMs 76 can define the locations of the bumps or package interconnects 78, which determine the BGA locations and the final package interconnect locations which can be held constant with respect to a package outline and be independent of misalignment of semiconductor die 24 within the package due to the unit specific patterning. Taken together, the unit specific patterning can be used in formation of the build-up interconnect layer or build-up interconnect layers 80, which can include features 58-78 or 64-78.

Semiconductor packages 50 can also comprise and optional backside coating or die attach material 82. Backside coating 82 can extend over an entire backside of the package 50, or can be limited within a footprint of the semiconductor die.

FIG. 2B shows a plan view of a bottom side of the semiconductor package 50, which was shown in cross-sectional view in FIG. 2A. FIG. 2B shows the semiconductor package 50 with a package outline 90 and a semiconductor die outline 92 for semiconductor die 24. Package 50 shows pads 70 and traces 71 of RDL 68. A UBM mask can be formed over the package 50 with openings over the pads 70. The package 50 includes unit specific regions, adaptive regions, or bounding boxes 94 in which unit specific patterning can occur, such as when a prestratum is used. In other instances, unit specific patterning can occur without respect to a contained unit specific region 94, or stated another way, the unit specific region 94 can include an entire surface of footprint of the package 50. The package 50 can also include fiducials, L-fiducials, or alignment fiducials 96.

Continuing from FIGS. 2A and 2B, a system and method for AOI of packages formed with unit specific patterning for defects, is discussed in greater detail. The unit specific patterning of packages 50 can comprise a system and method for adjusting elements of a semiconductor package, including one or more parts, elements, or features of build-up interconnect structures 80. Unit specific patterning can compensate for shift or relative movement of semiconductor die within a panelized package or reconstituted wafer that can occur, for example, during encapsulation of semiconductor die. The relative position or shift of the semiconductor die can be with respect to the final package, with respect to a position or location on a panel or reconstituted wafer, or both. The AOI system and method for unit specific patterning disclosed herein allows for inspecting unit specific patterned packages 50 while part of the reconstituted wafer 52, whether the package 50 is partially or totally completed. However, before continuing to describe AOI for packages 50 with respect to FIG. 3, a number of Applicant's insights into the benefits of AOI for packages comprising unit specific patterning are presented.

Conventional optical inspection uses a golden image based methodology, as described in the background section. However, conventional optical inspection is unable to inspect packages and structures for packages that including unit specific patterning. Conventional optical inspection is ineffective for unit specific patterning because the features or patterns inspected during optical inspection may, when correctly formed according to the desired unit specific design, be unique and not conform to an average or golden image. To the contrary, a unit specific pattern could have been incorrectly or improperly executed or built if an entirety of the unit specific pattern conformed to an entirety of an average or golden image. As such, for applications involving unit specific patterning, a golden image cannot be created from known-good parts for an entirety of the pattern since portions of the patterned material can be different or vary from an "average" when correctly constructed.

Thus, current optical inspection methods can be used to inspect only limited portions of a unit specific patterned package, and not an entirety of the package. For unit specific designs wherein dynamic traces are drawn from a fixed pattern or prestratum to shifting via capture pads or traces 71, the unit specific region or bounding box 94 around each dynamic trace formed within the unit specific region 94 can be ignored and the stationary or fixed portion of the pattern, i.e. the prestratum, can be inspected. However, this method of partial inspection does not inspect the unit specific, adaptive, custom, or dynamically formed traces for defects.

For unit specific designs where the geometry of the redistribution layer is fixed, but is translated and rotated to match die shift, a golden image can be re-aligned to the shifted RDL pattern before performing the comparison. However, all layers under inspection may not have the same alignment. Therefore this method requires inspecting each set of aligned layers separately, or ignoring regions of misalignment. As indicated above, unit specific alignment wafers with only the RDL layer, such as RDL 68, being customized as part of a unit-specific design can be analyzed with a traditional golden image method by aligning the golden image to the acquired image. However, as additional features are added in subsequent steps, such as UBM layer 76 or bumps 78, the additional features will not necessarily be aligned to the RDL patterns, and the acquired image will be made from two shifted or rotated layers. As every semiconductor die 24 could have a different shift or rotation, the traditional golden image method is problematic, time consuming, expensive, and technically unsuited for use in performing a complete optical inspection.

Thus, a need exists for AOI of unit specific patterning that allows for efficient and reliable inspection for unit specific patterning in packages 50 and detection of defects. A defect can be defined as the deviation from the perfect product or golden image. The system and method for AOI of packages 50 comprising unit specific patterning accounts for the dynamic patterns created with unit specific patterning by changing the definition of a perfect product for every die. The perfect product itself can be a dynamic, unique, or unit specific reference or standard, such as unique reference standard, against which the unit specific pattern or features of the build-up interconnect layer 80 can be measured, compared, or tested. As such the unique reference standards are adjusted for, include, or take account of, elements of the patterns, features, or unit specific patterns on each package to compensate for unit specific patterning.

Additional consideration is now given to how AOI for unique semiconductor packages comprising unit specific patterning within a same reconstituted wafer can be performed. The unique reference standards created for each package, once created, can then be compared to images captured during inspection of unit specific patterns formed over or connected to the semiconductor die. As will be discussed with respect to the following FIGS., the unique reference standards can be an images created from the CAD artwork for each package. Pre-processing may be performed on the reference images and the images of the inspected part before comparison. Alternatively, and also as discussed with respect to the following FIGS., the reference can be a geometry dataset describing the expected features.

One way of providing AOI for a plurality of unique semiconductor packages comprising unit specific patterning includes using computer aided design (CAD) files. The solutions described below involve comparing the design or CAD files to one or more images of the unit specific patterns acquired from an AOI system. Of note is that the CAD files are binary, while the acquired images from the AOI are gray scale. Thus, to compare, by subtraction or other method, the CAD files and the acquired images, a number of approaches can be used. In a first aspect, binary CAD files can be converted to gray scale as part or forming unique reference standards, such as through acquired image space, to allow a comparison between a unique reference standard and a corresponding unit specific pattern. The first aspect is presented in greater detail with respect to FIGS. 3-5F. In a second aspect, a comparison can be conducted by converting both the CAD files and the acquired image to a common space or third space. The second aspect is presented in greater detail with respect to FIGS. 6-7D. In a third aspect, gray scale images acquired by visual inspection can be converted to a binary format such as, or compatible with, CAD data space. The third aspect is presented in greater detail with respect to FIGS. 8A-9D. In implementing the various aspects of the method of AOI for a plurality of unique semiconductor packages, multiple CAD files can be needed to make a complete product. Furthermore, the various aspects can be used together with each other and with additional aspects not relying on CAD files.

Figure 3:
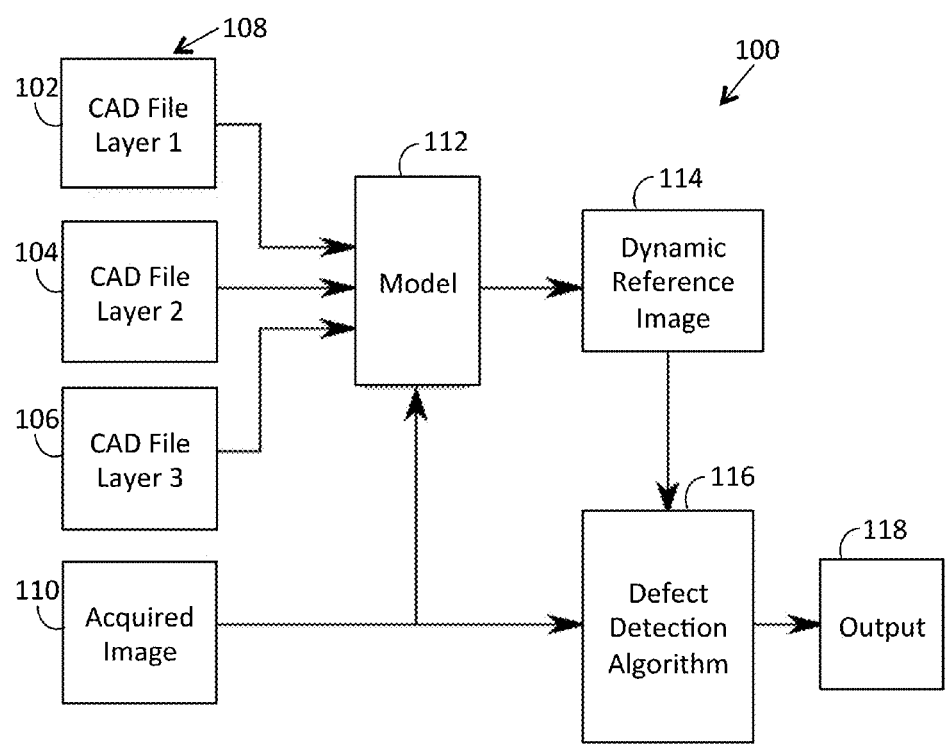
FIG. 3 illustrates a flowchart of a method of AOI for unit specific patterning.

FIG. 3 shows a flow chart or method 100 that presents information relative to converting CAD data into acquired image space. CAD data or a CAD design 108 can be in the form of one or more CAD files that can include one or more layers, such as CAD file Layer 1 or CAD file 102, CAD file Layer 2 or CAD file 104, and CAD file Layer 3 or CAD file 106. All the CAD files 102, 104, and 106, as well as an acquired image 110 of one or more unit specific patterns can be given as inputs to a model 112, which creates a dynamic reference image, unique reference standard, or unique reference image 114. The unique reference standard 114 can be created for every acquired image 110 and the unique reference standard 114 and a corresponding or respective acquired image 110 can then be compared to detect, determine, or identify defects. A comparison of a unique reference standard 114 and an acquired image 110 can be made for every semiconductor die 24 or one or more corresponding features of build-up interconnect 80 for each semiconductor die 24 included within the reconstituted wafer 52.

As such, the unique reference standard 114 can operate in place of, or as an improved or unique, "golden image," the unique reference standard 114 being a unique idealized image for each semiconductor package 50 or build-up structure 80. In applying defect detection algorithm 116, if the deviations derived from comparing of each pixel of an acquired image 110 and a corresponding unique reference standard 114 are within a specified gray scale range, then the part, feature, or element of build-up interconnect 80 captured in the acquired image 110 can be classified as defect-free. Two example models 112 used to generate the gray scale dynamic reference images include: 1) rasterizing the CAD files 102, 104, and 106, or convert an image stored as an outline within the files 102, 104, 106 into pixels that can be displayed on a screen or printed; and 2) modeling the relationship between the acquired image and its CAD files.

In some instance, the unique reference standard 114 can be generated by rasterizing the CAD files 102, 104, and 106, and then filling the rasterized image with specific pixel values corresponding to the combinations of materials on the part. This is discussed in greater detail with respect to FIG. 4, and creates unique reference standard 114 that will be used for subtractive comparison.

In other instances, the unique reference standard 114 can also be generated by modeling the relationship between the acquired image 110 and the CAD files 102, 104, and 106 within model 112. The edge response of material on the inspected part, such as a unit specific pattern, can be used to characterize a relationship between the design files the CAD files 102, 104, and 106 and the image 110 to generate unique reference standard 114. Model 112 can include use one or more of an edge response function, a line spread function (LSF), which is the derivative of the edge response function, or a point spread function (PSF). A PSF can be calculated from the LSF. Assuming that the system is linear and shift invariant within the model 112, the PSF can be used to produce the unique reference standard 114 for any CAD input file, such as CAD files 102, 104, and 106.

Figure 4:
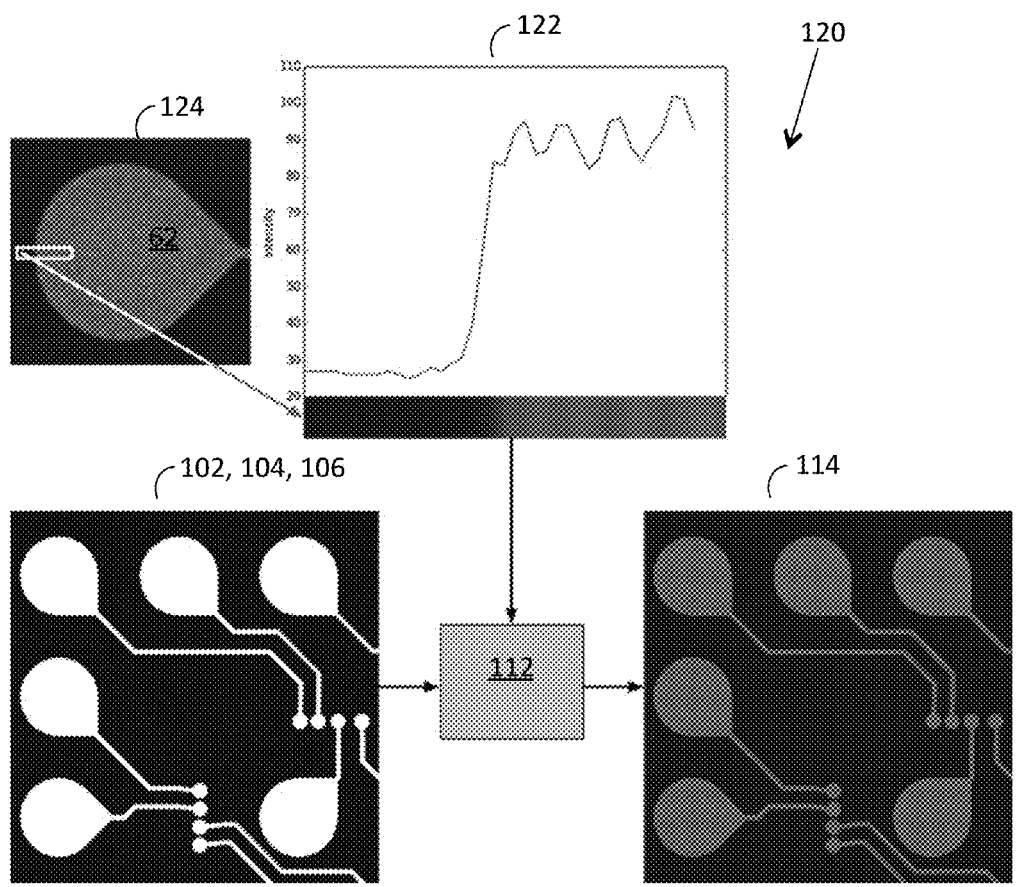
FIG. 4 illustrates a flowchart of an image undergoing image processing.

For both rasterizing and modeling methods within model 112, the unique reference standard 114 can be further processed before comparison at defect detection algorithm 116 to better model noise or other variations that are present in the captured images 110 of inspected parts. FIG. 4 provides an example of how reference images from the CAD files 102, 104, and 106 can undergo image processing at model 112 using a step response to create a better or more accurate unique reference standard 114.

FIG. 4 shows a flow chart 120 of how the image from the CAD files 102, 104, and 106 is processed to make it look more like the image 110. The data in CAD files 102, 104, and 106 is binary, either something is drawn or not drawn, while the images 110 have variations in topography, material thickness, and slope. The variations in a reference image 124, such as a conventional golden image or the acquired image 110, can be captured by the AOI or inspection device by measuring how the reference image 124 changes when transitioning from no patterned feature present (like no RDL 62) to a patterned feature being present (like RDL 62). The step between no feature present to a feature being present is referred to as the step response 122, which is illustrated as a line graph showing increasing intensity aligned with a corresponding bar at the bottom of the graph showing an enlarged gradient of intensity from the step of no RDL 62 to RDL 62. The step response 122 can then be transformed into an impulse response and convolved with one or more CAD binary images from the CAD files 102, 104, and 106 at model 112. The output from model 112 is the unique reference standard 114 that can have a patterned feature, in this case shown as RDL 62, the patterned feature comprising a shape of the CAD data, and further including the transition properties or step response 122 of the reference image 124. As such, the images in CAD files 102, 104, and 106 and the captured image 110 are more statistically similar to image 110 when no defect or error in patterning is present. Additionally, detecting defects, when defects are present, is also made easier when applying defect detection algorithm 116.

Measurement of the step response 122 can be done once per wafer, once per package, or any other number of times until a desired calibration is achieved. Furthermore, more than one step response 122 can be used for different transitions among different patterned features, such as between via 56 and RDL 62 or via 66 and RDL 68. Image processing within models like model 112 can be accomplished in a number of ways. Images can be converted into CAD image space, or binary space, using threshold filters. If both the CAD data and captured data, like data from images 110 or 124, are to be used as polygons, the capture image could be processed by an edge detection filter.

Figure 5A:
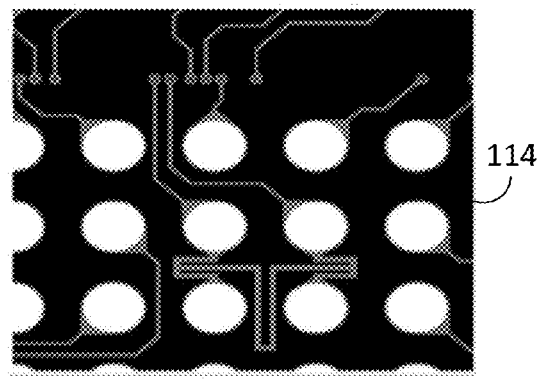
FIGS. 5A-5F illustrate a plurality of plan views of a portion of a semiconductor device used in a method of AOI.
Figure 5B:
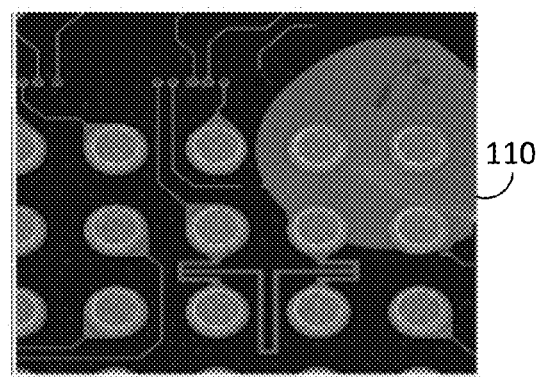
Figure 5C:
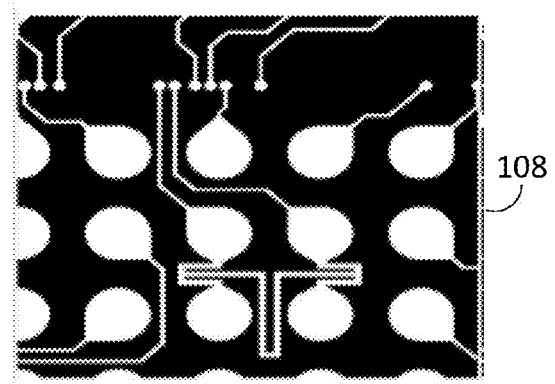
Figure 5D:
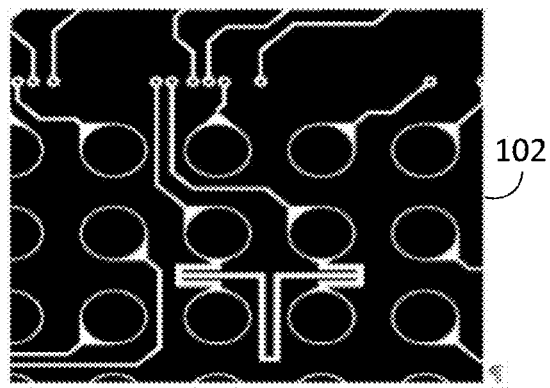
Figure 5E:
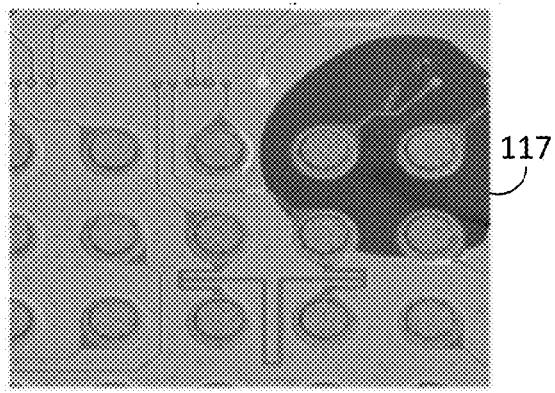
Figure 5F:

The images in FIGS. 5A-5E illustrate the process of detecting errors in an acquired image 110 by comparing the image 110 with a CAD design 108. More specifically, FIG. 5A shows a unique reference standard or a generated reference image 114. FIG. 5B shows an acquired image 110. FIG. 5C shows a CAD design 108. FIG. 5D shows a CAD file layer 102, the file layer being for only the RDL 68. FIG. 5E shows a difference image 117 illustrating a subtraction or difference between the acquired image 110 and the unique reference standard 114, which can be an output 118. FIG. 5F shows defect map 119 that can also be an output 118 that results after processing or running the defect detection algorithm 116.

As such, the method shown and described in FIG. 4 and FIGS. 5A-5F can include, first, each layer of the CAD data 108 being rasterized to a separate image of the same pixel size as the acquired image 110. Next, the unique reference standard or reference image 114 is generated by filling the regions in the rasterized CAD images with average values for each material. An overlap of two layers is considered a different material, since the pixel intensity is different (see example table below). The unique reference standard or reference image 114 an example of multiple materials, including overlapping layers. The unique reference standard or reference image 114 is subtracted pixel-by-pixel from the acquired image 110, resulting in the difference image 117 shown in FIG. 5E. Finally, the difference image 117 is threshold filtered, and then spatially filtered to remove noise. The resulting defect map 119 indicates defects with white pixels. Thus, the large blob-shaped defect 130 appears as a large white blob in the defect map 119. In addition, missing sections of RDL 68 or traces 71 that are present in the design data 108, but not the acquired image 110, appear as white traces.

Table 1, included below, shows sample ranges and values for pixel values used in the AIO process based on various material types for conversion of CAD images. While each of the material can have a value in a range of 0-255, the table shows by material a value that can also be used, or a range including plus or minus 10, 20, 50, or 100 with respect to each of the values shown.

TABLE 1

| Material | Pixel Value (0-255) |
| --- | --- |
| PRDL | 68 |
| PRDL-PVIA1 | 52 |
| PRDL-PUBV-UBM | 100 |
| PRDL-UBM | 100 |
| Mold | 40 |

Figure 6:
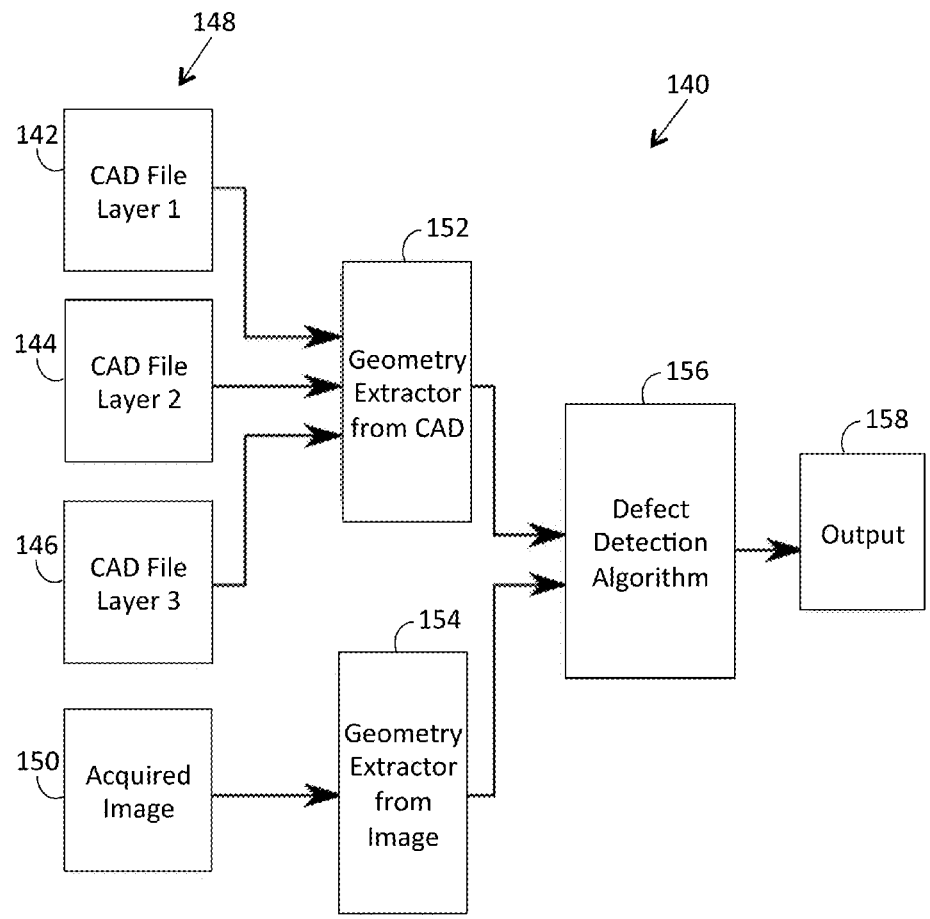
FIG. 6 illustrates a flowchart of a method of AOI for unit specific patterning.

FIG. 6 shows a flow chart or method 140 that presents information relative to converting CAD data 148 and an acquired image 150 to a common space. CAD data or a CAD design 158 can be in the form of one or more CAD files that can include one or more layers, such as CAD file Layer 1 or CAD file 142, CAD file Layer 2 or CAD file 144, and CAD file Layer 3 or CAD file 144. All the CAD files 142, 144, and 146, can be given as inputs to a geometry extractor 152. Similarly, an acquired image 150 can be given as an input to a geometry extractor 154. The geometry extractor 152 and the geometry extractor 154 can operate using blob algorithms and edge finding algorithms to process, produce, or both, polygons, arcs, and circles from the inputs of CAD designs 148 and acquired image 150. For example, the geometry extractor 154 can convert the acquired image 150 to a set of expected edges, arcs, and circles. Similarly, the geometry extractor 152 can work with the form of polygons, arcs, and circles output from the CAD designs 148, and were necessary convert the CAD designs 148 to a set of expected edges, arcs, and circles if not output in a desired form. The expected edges, arcs, and circles from the CAD designs 148 and the acquired image 150 can be are morphologically compared to those in the reference, or the unique reference standard 156. Similarly, the edges, polygons, arcs, and circles found by the algorithms in the CAD designs 148 and the acquired image 150 can be morphologically compared to those in the reference, or unique reference standard 156.

As used herein, the geometry extractor 152 can convert the CAD designs 148 to a set of expected edges, arcs, and circles, or to edges and blobs that operate as a unique reference standard for comparing the unique reference standard to an image 150 comprising unit specific patterns to determine defects at defect detection algorithm 156 in the common space. Therefore, the method of AOI of flowchart 140 can comprise detecting defects in the plurality of unit specific patterns by comparing one of the plurality of unique reference standards to a corresponding one of the plurality of images for each of the plurality of unit specific patterns, wherein the plurality of unique reference standards comprise geometry extracted from the plurality of CAD images to create extracted CAD geometry in a common space, and wherein the plurality of images for each of the plurality of unit specific patterns comprise geometry extracted from the plurality of images to create extracted image geometry in the common space, such that detecting defects in the plurality of unit specific patterns comprises detecting defects in the plurality of unit specific patterns by comparing extracted CAD geometry and the extracted image geometry in the common space.

Figure 7A:
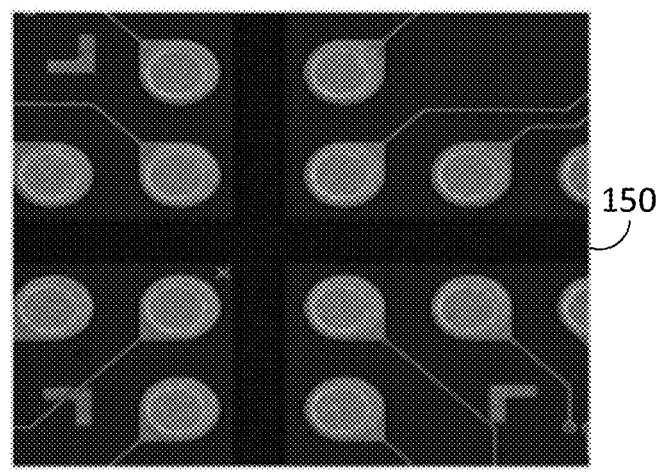
FIGS. 7A-7D illustrate a plurality of plan views of a portion of a semiconductor device used in a method of AOI.
Figure 7B:
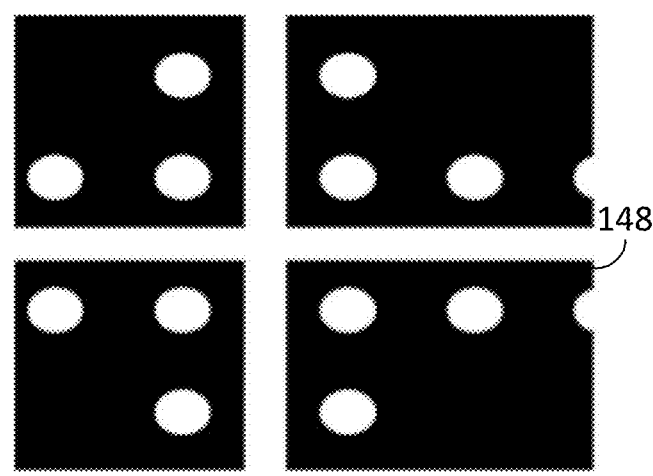
Figure 7C:
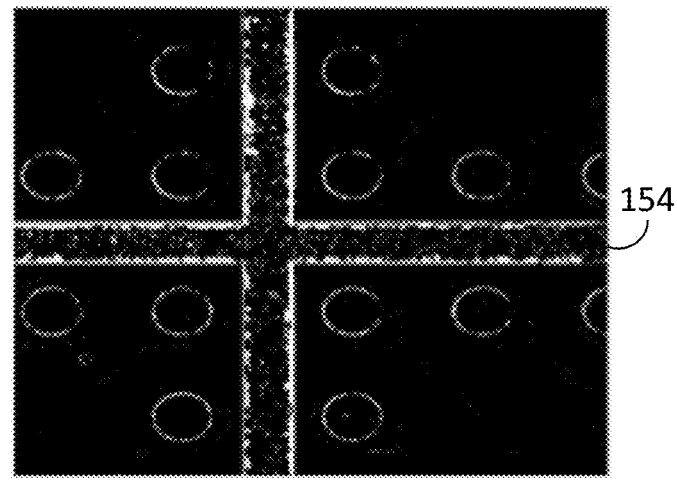
Figure 7D:
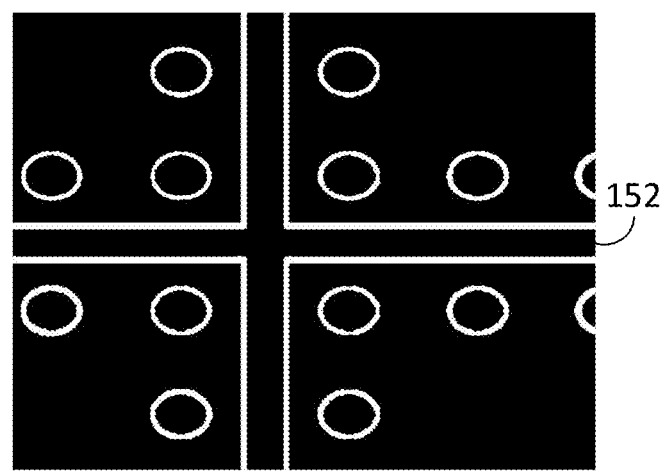

The images in FIGS. 7A-7D illustrate the process of detecting errors in an acquired image 150 by comparing geometry extracted from CAD data 148 and geometry extracted from the image 150 with defect detection algorithm 156. More specifically, FIG. 7A shows the acquired image 150. FIG. 7B shows a CAD file layer 142 that includes the UBV layer 76 from package 76. FIG. 7C shows edges of the UBV layer 76 and the semiconductor die outline 92 from the acquired image 150 as produced by the geometry extractor 154. FIG. 7D shows edges of the UBV layer 76 and the semiconductor die outline 92 from the CAD file layer 142 as produced by the geometry extractor 152.

An example of the approach or method shown in flowchart 140 can comprise converting all the features in the acquired image 150 as well as the CAD files 148 into geometric objects using one or more suitable algorithms, such as, e.g., edge detection algorithms and thresholding algorithms. The examples shown in FIGS. 7A-7D shows using higher intensities at edges of the UBV layer 76 and lower intensity at the dark lines to isolate the features relevant to the UBV layer 76. As shown in the example, the images can then be broken down to geometrical shapes like circles and rectangles. The centers and the diameters of the circles, as well as the position and thickness of the rectangles, can then be checked against the design values in the CAD files.

Figure 8A:
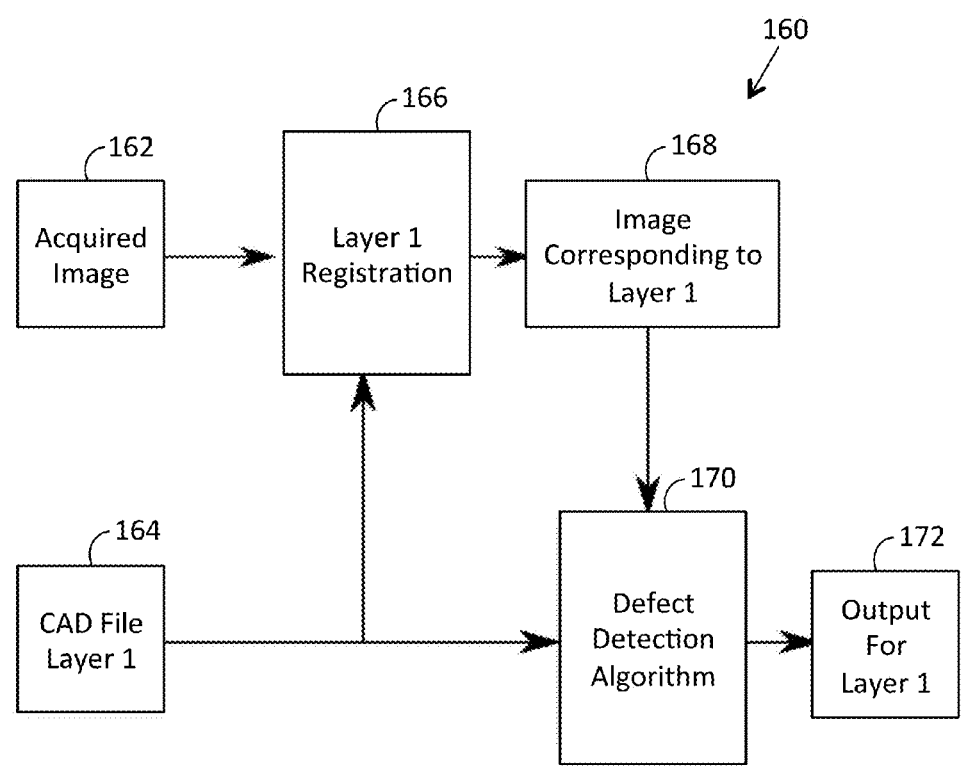
FIGS. 8A and 8B illustrate flowcharts of a method of AOI for unit specific patterning.
Figure 8B:
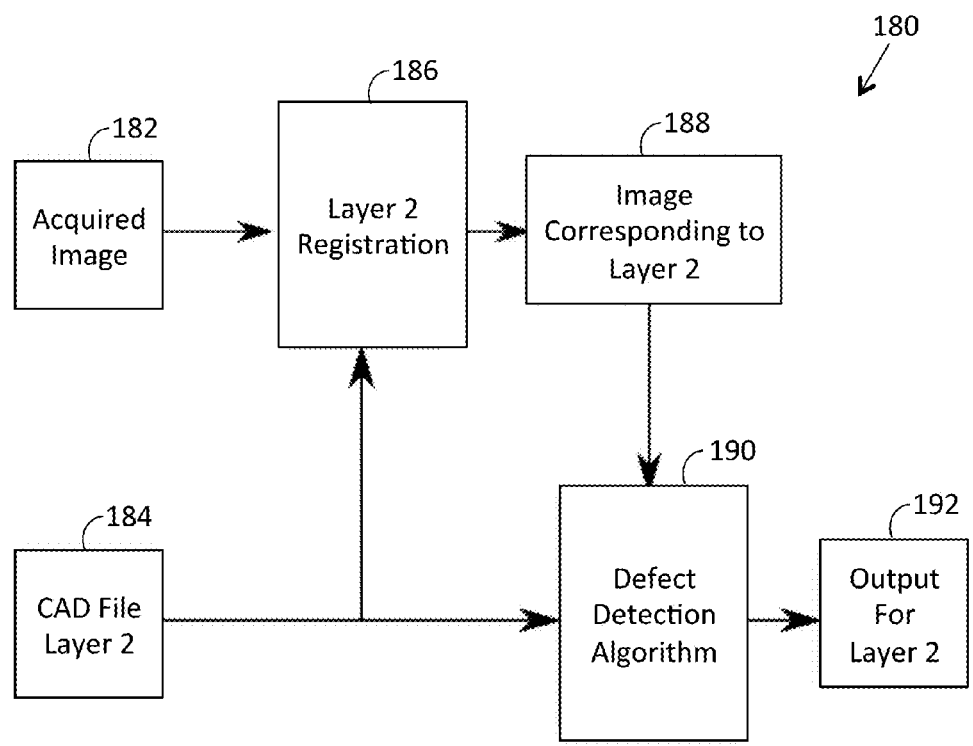

FIGS. 8A and 8B show similar flow charts or methods 160 and 180, respectively, that present information relative to converting image data from an acquired image to CAD data to allow detection of errors in CAD data space. Flow chart 160 shows an acquired image 162 can include data that can be processed at "Layer 1 Registration" 166 to include only spatial features relevant to a CAD file Layer 1, CAD file, or unique reference standard 164. The acquired image data within the mask or within the footprint 90 of the semiconductor package 50 is expected to be within a range of gray scale values. Deviations from the gray scale values would be classified as error by the defect detection algorithm 170. In the absence of error, the defect detection algorithm will produce an output for layer 1 or output 172. Because images are being converted to CAD data space, as many comparisons are needed as the number of CAD files. Thus, in the example of FIGS. 8A and 8B, two CAD files 164, and 184, are being compared and two comparisons are likewise needed to produce outputs 172 and 192. Hence the process shown in flow 160 in FIG. 8A and in flow 180 in FIG. 8B can be identical or substantially identical except for the differences between CAD file layers, such as CAD file layer 164 and CAD file layer 184. In some instances, the process flow 160 and the process flow 180 can use different acquired images for acquired image 162 and acquired image 182. In other instances, the process flow 160 and the process flow 180 can use the same or identical images for both acquired image 162 and acquired image 182. The acquired images 162 and 182 can be identical because a portion of the acquired image being inspected can contain the patterned portion, feature, or inspected part that corresponds to the patterned portion, feature, or inspected part included or contained within multiple CAD file layers, such as CAD file layer 164 and CAD file layer 184.

For flow 160, when converting acquired image or image data 162 to CAD data space, the gray-scale image 162 can be converted into a binary file 168 to compare against the binary CAD files 164 at the layer 1 registration 166. The layer 1 registration 166 can be performed or accomplished by different algorithms including thresholding, using a spatial mask from the CAD file 164, or a combination of masking and thresholding or other suitable algorithms. The binary image 168 can then be subtracted at defect detection algorithm 170 to make a difference image 171. Minimum size filters can then applied to the difference image 171 to get the defect map 173, which can be produced as output 172. Thus, detection of errors in CAD data space can be achieved, as shown in FIG. 8A, by comparing a unique reference standard 164 and an acquired image 162 that has been processed to produce a corresponding image 168, the comparison occurring one layer at a time for every CAD file layer 164 for every semiconductor die 24 within the reconstituted wafer 52.

For flow 180, when converting acquired image or image data 182 to CAD data space, the gray-scale image 182 can be converted into a binary file 188 to compare against the binary CAD files 184 at the layer 2 registration 186. The layer 2 registration 186 can be performed or accomplished by different algorithms including thresholding, using a spatial mask from the CAD file 184, or a combination of masking and thresholding or other suitable algorithms. The binary image 188 can then be subtracted at defect detection algorithm 190 to make a difference image 191. Minimum size filters can then applied to the difference image 191 to get the defect map 193, which can be produced as output 192. Thus, detection of errors in CAD data space can be achieved, as shown in FIG. 8B, by comparing a unique reference standard 184 and an acquired image 182 that has been processed to produce a corresponding image 188, the comparison occurring one layer at a time for every CAD file layer 184 for every semiconductor die 24 within the reconstituted wafer 52.

Figure 9A:
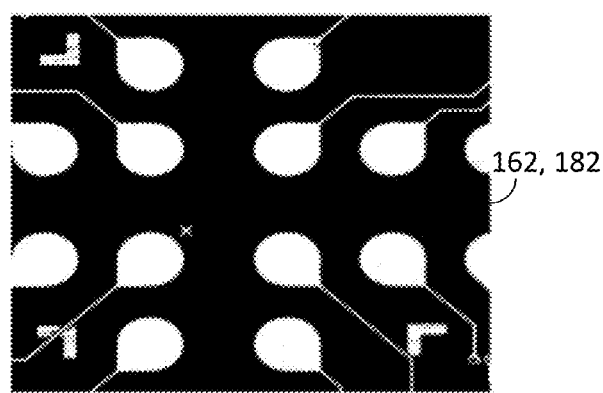
FIGS. 9A-9D illustrate a plurality of plan views of a portion of a semiconductor device used in a method of AOI.
Figure 9B:
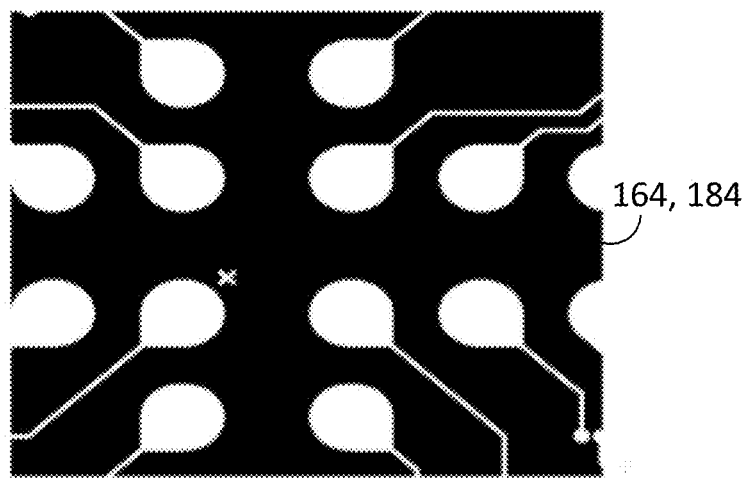
Figure 9C:
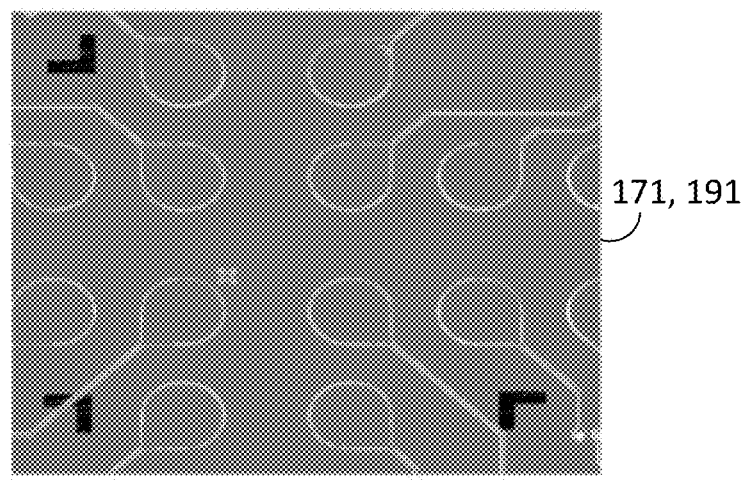
Figure 9D:
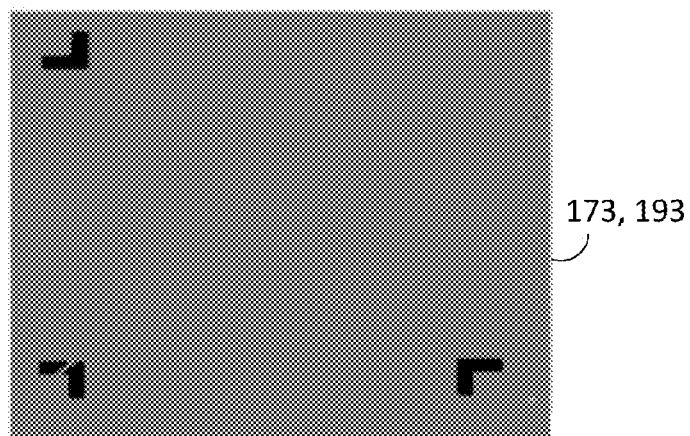

The images in FIGS. 9A-9D illustrate the process of detecting errors in an acquired image 162 by comparing a CAD file or unique reference standard 164 to image 162 by converting image data from the acquired image 162 to corresponding image 168 in CAD data space to allow detection of errors between the image 162 and the CAD file layer 164. More specifically, FIG. 9A shows an acquired image 162, 182 that comprises a unit specific pattern, or patterned feature, formed as an RDL, such as, e.g., RDL 68. FIG. 9B shows a CAD file, 164, 184 that comprises a unit specific pattern, or patterned feature, formed as an RDL, such as, e.g., RDL 68. FIG. 9C shows a image 171, 191 between the CAD file layer 164, 184 and binary image 168, 188 that comprises a unit specific pattern, or patterned feature, formed as an RDL, such as, e.g., RDL 68. FIG. 9D shows a defect map 173, 193 for defects that exist in a unit specific pattern, or patterned feature, formed as an RDL, such as, e.g., RDL 68.

Figure 10:
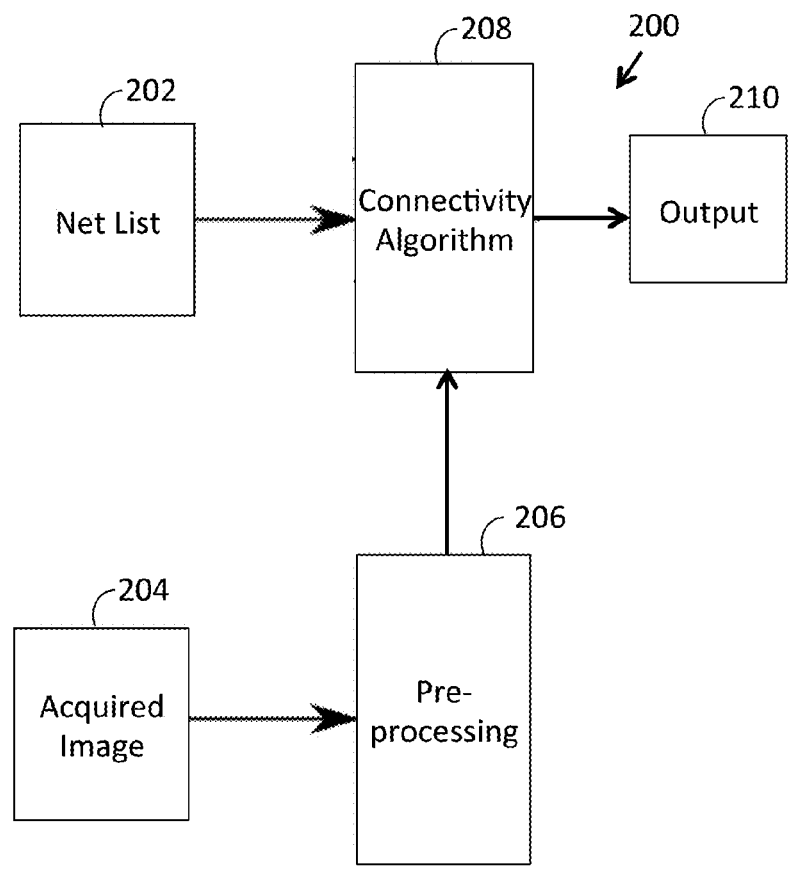
FIG. 10 illustrates a flowchart of a method of AOI for unit specific patterning.

FIG. 10 presents a flow chart 200 for another method of AOI for a plurality of unique semiconductor packages comprising unit specific patterning, the method using a net list 202 as a unique reference standard to compare against a captured image or acquired image 204. The net list 202 can specify a plurality of coordinates, such as XY coordinates or other suitable coordinates used to define a design, area, or net that is associated with, or corresponds to, an electrical net. Examples of such coordinates are shown in FIGS. 11B and 11C as first coordinate or XY coordinate 220 and second coordinate or XY coordinate 222. Each coordinate in the design can be expected to be conductively connected to all other coordinates on the same net. The net list 202 contains a list of coordinates (within a given package 50 or wafer 52) and an associated net for each coordinate. One net list 202 can comprise lists of coordinates for a plurality of different electrical nets that can be electrically isolated or distinct from each other. The net list 202 can be generated by, or created as an output from, an electronic CAD tool.

The net list 202 can be checked for electrical connectivity by using connectivity algorithm 208. The algorithms used for connectivity algorithm 208 can be a pixel fill algorithm or a wavefront expansion algorithm if the check is done on pixel data. If the data is converted to polygons, the connectivity can be done by checking for polygon overlap or intersection. When using polygons, the connectivity algorithm 208 should ensure that the overlapping polygons when taken together are continuous, and not several "islands". In the event either pixels or polygons, the data used for the connectivity algorithm 208 can come from the acquired image 204, which can undergo pre-processing 206 prior to being input to the connectivity algorithm 208. The preprocessing 206 of the captured AOI image 204 of the package 50 can undergo pre-processing to transform the acquired image 204 into a binary image of conductive paths and non-conductive paths that is input to the connectivity algorithm 208.

For connectivity inspection (which can include identifying both open circuits and short circuits), the net list 202 can be used as a unique reference standard when comparing the unique reference standard to the acquired image 204 after pre-processing 206. Thus, the net list 202 can be used instead of CAD artwork for making the comparison with a unique reference standard as described with respect to FIGS. 4, 6, and 8.

To verify connectivity of patterned features on the captured AOI image 204, the image 204 can be first transformed into a binary image of conductive paths and non-conductive paths through pre-processing 206. Then coordinates of the net list 202 can be mapped onto the image 204 after processing 206, and a search or connectivity algorithm 208 can be used to find a path between the coordinates within the conductive regions defined by the net list 202. To verify that separate nets within the net list 202 are not connected, a pixel expansion algorithm or fill algorithm can be used to expand around coordinates to fill the region. If the expansion fills all available pixels without the net without touching another net, then no short-circuit exists among the nets, and the information of no short-circuits can be delivered as an output 210. Coordinates of the same net within net list 202 are expected to be electrically connected by conductive material in the captured images 204. During inspection, for each coordinate, an entire shape that is overlapped, under, or contacted by the coordinate is traced and marked with an associated net (if not already marked). When the shape under the coordinate is already marked with a net, the marked net and the current XY coordinate's net must match or a short will be present. The tracing of the shape under the coordinate can be done with a pixel-wise fill algorithm. The tracing of the shape under the coordinate can also be done with an edge detection algorithm to generate a polygon boundary.

Alternative algorithms can be used a part of applying connectivity algorithm 208 for verifying the connectivity between coordinates or points, such as a graph search on the pixel data. When using a graph search on the pixel data, one coordinate in the net list is used as the starting point, and a graph search finds a path through conductively colored and contiguous pixels only to the other net list coordinates. If such a path does not exist, the net has an open. Conversely, to check for short-circuits or shorts, the search must also exhaustively verify that no such path exists to coordinates of other nets. To enhance performance, the search can be limited to only nets that are expected to neighbor each other. If the shapes from the captured image are processed into polygons, the inspection can simply check whether polygons from the same net overlap and verify that the polygons form a contiguous region. If any of the polygons overlaps a polygon from another net, a short defect is present.

As part of the connectivity algorithm 208, spacing between electrical nets from net list 202 can be verified by dilating each polygon or pixel shape before checking for overlaps with other nets. The dilation can be one half of the necessary spacing between nets, or about one half of the necessary spacing. As used herein, "about" is equal to plus or minus 5%, 10%, 20% of the necessary spacing. If the captured image does not contain shorts after dilation (according to the net list) then the captured image does not contain spacing defects. Minimum width can be checked by eroding each polygon or pixel shape by one half of the minimum feature size, or about one half the feature size. As used herein, "about" is equal to plus or minus 5%, 10%, 20% of the feature size. If the connectivity indicated in the net list still exists after erosion, then the captured image does not contain a minimum width defect.

Figure 11A:
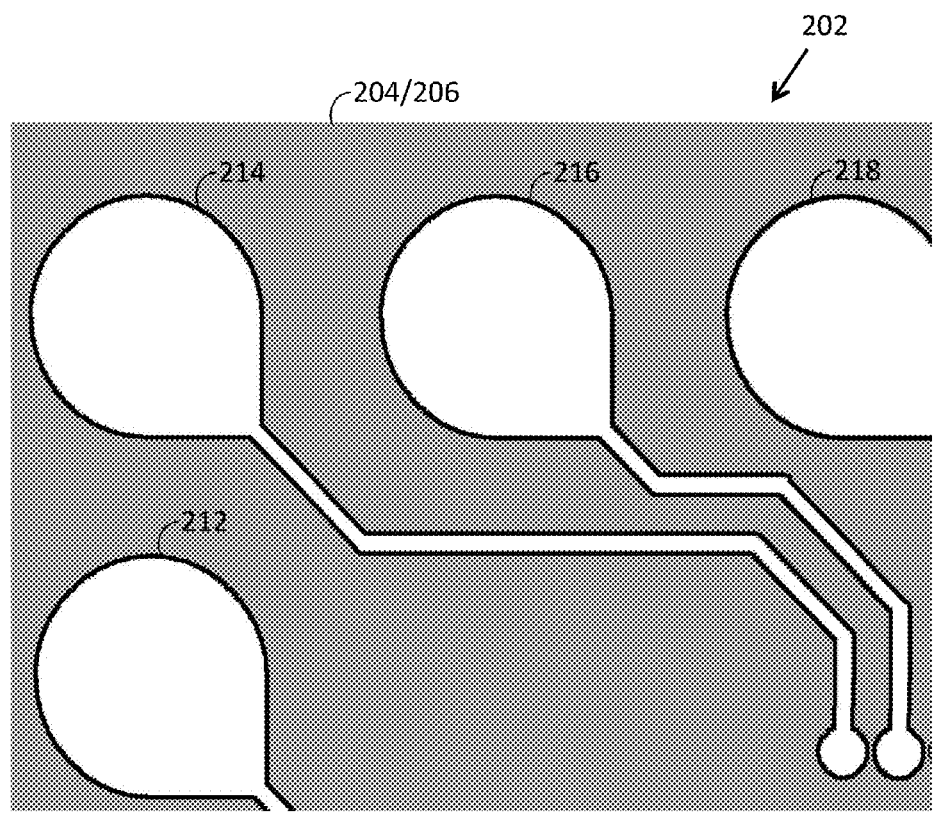
FIGS. 11A-11C illustrate a plurality of plan views of a portion of a semiconductor device used in a method of AOI
Figure 11B:
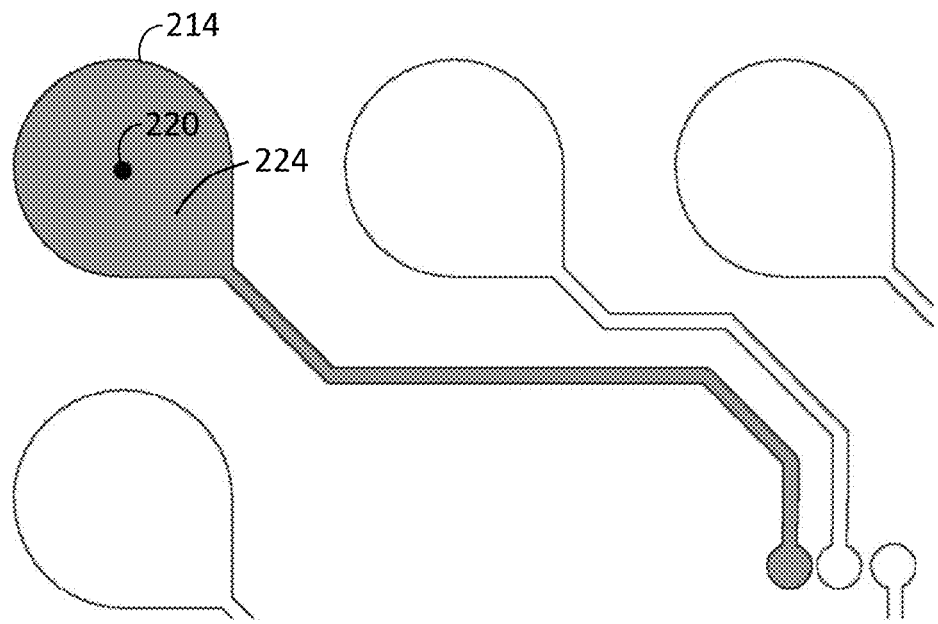
Figure 11C:
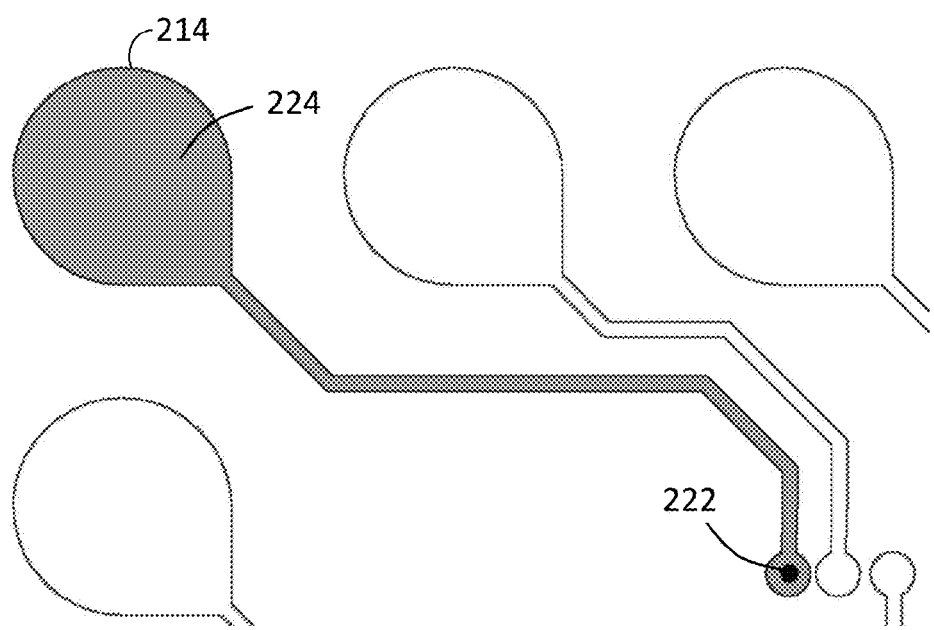

FIGS. 11A-11C show various images relating to the use of the net list method 200 for electrical connectivity validation discussed above with respect to FIG. 10A. FIG. 11A shows an acquired image 204 after conversion to a binary conductive/non-conductive view by pre-processing 206. FIG. 11A also shows tracing and marking of shapes from the acquired image 204 by nets, so that a the net list 202 includes a first net 212, a second net 214, a third net 216, and a fourth net 218, where the solid lines enclosing the RDL 68 define the respective nets 212, 214, 216, and 218. FIG. 11B shows a first coordinate or XY coordinate 220 within the second net 214, with the second net 214 overlapping a shape 224 (shown in gray) of a portion of the acquired image 204. The shape 224 can be of a portion of a patterned structure or unique patterned structure such as RDL 68. FIG. 11C is similar to FIG. 11B, but shows a second coordinate or XY coordinate 220 from the second net 214 that overlaps the same shape 224, the shape 224 being marked with the same second net 214, which verifies connectivity of the first coordinate 220 and the second coordinate 222. If, however, the shape 224 were marked with different nets, such as first net 212 and second net 214, the first coordinate 220 being within the first net 212 and the second coordinate 222 being within the second net 214, then a short would exist.

A number of different aspects of AOI of uniquely patterned semiconductor packages 50 have been described. The various aspects could be used separately or together for a same package 50, a same reconstituted wafer 52, or any other package structure that uses unit specific patterning, such as printed circuit boards or substrates with embedded die or face down wafer level fan-out packages. The various different aspects or methods can be better suited for finding different defect types, and some defect inspections can be done optimally with a combination of elements from each of the aspects or methods described herein. Additionally, differing aspects or methods of the various AOI methods could also be used in parallel, or at a same time, to inspect specific regions of a same semiconductor die 24, semiconductor package 50, or reconstituted wafer 52.

In accordance with the foregoing, inspecting a wafer level package using a dynamic reference and generating the dynamic reference from per-package CAD artwork provides a novel method for AOI of unit specific patterning. Accordingly, the AOI method for unit specific patterning facilitates production of semiconductor packaging comprising unit specific patterning by allowing for thorough inspection of product for improved quality control.

Where the above examples, embodiments and implementations reference examples, it should be understood by those of ordinary skill in the art that other manufacturing devices and examples could be intermixed or substituted with those provided. In places where the description above refers to particular embodiments, it should be readily apparent that a number of modifications may be made without departing from the spirit thereof and that these embodiments and implementations may be applied to other technologies as well. Accordingly, the disclosed subject matter is intended to embrace all such alterations, modifications and variations that fall within the spirit and scope of the disclosure and the knowledge of one of ordinary skill in the art.

What is claimed is:

1. A method of automated optical inspection (AOI) for a plurality of unique semiconductor packages comprising:
    providing a plurality of semiconductor die formed as a reconstituted wafer;
    forming a plurality of unit specific patterns by forming a unit specific pattern over each of the plurality of semiconductor die, wherein each of the unit specific patterns is customized to fit its respective semiconductor die;
    acquiring a plurality of images by acquiring an image for each of the plurality of unit specific patterns;
    creating a plurality of unique reference standards by creating a unique reference standard for each of the plurality of unit specific patterns;
    detecting defects in the plurality of unit specific patterns by comparing one of the plurality of unique reference standards to a corresponding one of the plurality of images for each of the plurality of unit specific patterns; and
    singulating the reconstituted wafer to form the plurality of unique semiconductor packages.

2. The method of AOI of claim 1, further comprising:
    pre-processing the plurality of images for each of the plurality of unit specific patterns by converting the plurality of images into a plurality of binary images, the plurality of binary images indicating conductive paths and non-conductive paths;
    creating the plurality of unique reference standards as a plurality of net lists of XY coordinates; and
    comparing one of the plurality of net lists of XY coordinates to the corresponding one of the plurality of binary images for each of the plurality of unit specific patterns by mapping the one of the plurality of net lists of the XY coordinates onto the one of the plurality of binary images for each of the plurality of unit specific patterns.

3. The method of AOI of claim 2, further comprising finding a path between XY coordinates of one of the plurality of net lists within the conductive paths of the binary images using a search algorithm or connectivity algorithm to validate electrical connectivity.

4. The method of AOI of claim 2, further comprising verifying that separate nets of the plurality of net lists are not connected using a pixel expansion algorithm or fill algorithm.

5. The method of AOI of claim 1, further comprising:
providing a plurality of computer-aided design (CAD) images comprising a CAD image corresponding to each of the unit specific patterns formed over each of the plurality of semiconductor die; and
creating the plurality of unique reference standards by creating a plurality of dynamic reference images by rasterizing or modeling the plurality of CAD images for each of the plurality of unit specific patterns.

6. The method of AOI of claim 5, further comprising rasterizing the plurality of CAD images for each of the plurality of unit specific patterns using a step response to create grayscale images before comparing one of the plurality of dynamic reference images to the corresponding one of the plurality of images for each of the plurality of customized patterns to detect defects in the plurality of unit specific patterns.

7. The method of AOI of claim 1, further comprising:
providing a plurality of computer-aided design (CAD) images comprising a CAD image corresponding to each of the unit specific patterns formed over each of the plurality of semiconductor die;
wherein the plurality of unique reference standards comprise geometry extracted from the plurality of CAD images to create extracted CAD geometry in a common space;
wherein the plurality of images for each of the plurality of unit specific patterns comprise geometry extracted from the plurality of images to create extracted image geometry in the common space; and
wherein detecting defects in the plurality of unit specific patterns comprises detecting defects in the plurality of unit specific patterns by comparing extracted CAD geometry and the extracted image geometry in the common space.

8. The method of AOI of claim 1, further comprising:
providing a plurality of computer-aided design (CAD) images comprising a CAD image corresponding to each of the unit specific patterns formed over each of the plurality of semiconductor die;
converting the plurality of images of the unit specific patterns from grayscale images to binary images to form a plurality of binary images for the plurality of unit specific patterns; and
detecting defects in the plurality of unit specific patterns by comparing binary data from the plurality of CAD images and the plurality of binary images for the plurality of unit specific patterns.

9. The method of AOI of claim 1, further comprising forming the plurality of unit specific patterns comprising one or more redistribution layers (RDLs), traces, vias, pillars, columns, under bump metallizations (UBMs), or bumps.

10. The method of AOI of claim 1, further comprising determining which of the plurality of unique semiconductor packages are known good units from detecting defects in the plurality of unit specific patterns.

11. A method of automated optical inspection (AOI) for a plurality of unique semiconductor packages comprising:
acquiring a plurality of images by acquiring an image for each of a plurality of unit specific patterns formed on a reconstituted wafer;
creating a plurality of unique reference standards by creating a unique reference standard for each of the plurality of unit specific patterns; and
detecting defects in the plurality of unit specific patterns by comparing one of the plurality of unique reference standards to a corresponding one of the plurality of images for each of the plurality of unit specific patterns.

12. The method of AOI of claim 11, further comprising:
pre-processing the plurality of images for each of the plurality of unit specific patterns by converting the plurality of images into a plurality of binary images, the plurality of binary images indicating conductive paths and non-conductive paths;
creating the plurality of unique reference standards as a plurality of net lists of XY coordinates; and
comparing one of the plurality of net lists of XY coordinates to the corresponding one of the plurality of binary images for each of the plurality of unit specific patterns by mapping the one of the plurality of net lists of the XY coordinates onto the one of the plurality of binary images for each of the plurality of unit specific patterns.

13. The method of AOI of claim 12, further comprising finding a path between XY coordinates of one of the plurality of net lists within the conductive paths of the binary images using a search algorithm or connectivity algorithm to validate electrical connectivity.

14. The method of AOI of claim 12, further comprising verifying that separate nets of the plurality of net lists are not connected using a pixel expansion algorithm or fill algorithm.

15. The method of AOI of claim 11, further comprising:
providing a plurality of computer-aided design (CAD) images comprising a CAD image corresponding to each of the unit specific patterns formed over each of the plurality of semiconductor die; and
creating the plurality of unique reference standards by creating a plurality of dynamic reference images by rasterizing or modeling the plurality of CAD images for each of the plurality of unit specific patterns.

16. The method of AOI of claim 15, further comprising rasterizing the plurality of CAD images for each of the plurality of unit specific patterns using a step response to create grayscale images before comparing one of the plurality of dynamic reference images to the corresponding one of the plurality of images for each of the plurality of customized patterns to detect defects in the plurality of unit specific patterns.

17. The method of AOI of claim 11, further comprising:
providing a plurality of computer-aided design (CAD) images comprising a CAD image corresponding to each of the unit specific patterns formed over each of the plurality of semiconductor die;
wherein the plurality of unique reference standards comprise geometry extracted from CAD images to create extracted CAD geometry in a common space;
wherein the plurality of images for each of the plurality of unit specific patterns comprise geometry extracted from the plurality of images to create extracted image geometry in the common space; and
wherein detecting defects in the plurality of unit specific patterns comprises detecting defects in the plurality of unit specific patterns by comparing extracted CAD geometry and the extracted image geometry in the common space.

18. The method of AOI of claim 11, further comprising:
providing a plurality of computer-aided design (CAD) images comprising a CAD image corresponding to each of the unit specific patterns formed over each of the plurality of semiconductor die;

converting the plurality of images of the unit specific patterns from grayscale images to binary images to form a plurality of binary images for the plurality of unit specific patterns; and detecting defects in the plurality of unit specific patterns by comparing binary data from the plurality of CAD images and the plurality of binary images for the plurality of unit specific patterns.

19. The method of AOI of claim 11, further comprising forming the plurality of unit specific patterns comprising one or more redistribution layers (RDLs), traces, vias, pillars, columns, under bump metallizations (UBMs), or bumps.

20. The method of AOI of claim 11, further comprising determining which of the plurality of unique semiconductor packages are known good units from detecting defects in the plurality of unit specific patterns.

* * * * *